United States Patent
Liu et al.

(10) Patent No.: US 9,698,442 B2
(45) Date of Patent: Jul. 4, 2017

(54) METHOD FOR MAKING MEMBRANE ELECTRODE ASSEMBLY

(71) Applicants: Tsinghua University, Beijing (CN); HON HAI PRECISION INDUSTRY CO., LTD., New Taipei (TW)

(72) Inventors: Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 433 days.

(21) Appl. No.: 14/145,006

(22) Filed: Dec. 31, 2013

(65) Prior Publication Data

US 2014/0113219 A1    Apr. 24, 2014

Related U.S. Application Data

(63) Continuation of application No. 12/006,336, filed on Dec. 29, 2007, now abandoned.

(30) Foreign Application Priority Data

Nov. 2, 2007    (CN) .......................... 2007 1 0124247

(51) Int. Cl.
*H01M 8/10* (2016.01)
*H01M 4/04* (2006.01)
*H01M 8/1004* (2016.01)
*H01M 8/0234* (2016.01)
*H01M 4/90* (2006.01)
*H01M 8/1018* (2016.01)

(52) U.S. Cl.
CPC ....... *H01M 8/1004* (2013.01); *H01M 4/9083* (2013.01); *H01M 8/0234* (2013.01); *H01M 4/90* (2013.01); *H01M 2008/1095* (2013.01); *Y02P 70/56* (2015.11); *Y10T 156/10* (2015.01)

(58) Field of Classification Search
CPC . H01M 8/1004; H01M 8/0234; H01M 4/9083
See application file for complete search history.

(56) References Cited

U.S. PATENT DOCUMENTS

| | | | |
|---|---|---|---|
| 6,616,495 B1 * | 9/2003 | Tsuboi | B82Y 10/00 313/309 |
| 6,790,425 B1 * | 9/2004 | Smalley | B82Y 30/00 423/445 R |
| 8,808,589 B2 * | 8/2014 | Wang | C01B 31/0253 264/442 |
| 8,846,144 B1 * | 9/2014 | Wang | H01B 1/04 252/514 |
| 9,160,019 B2 * | 10/2015 | Liu | H01M 8/0234 |

(Continued)

FOREIGN PATENT DOCUMENTS

WO    WO 2006137893 A2 * 12/2006 ............. B82Y 30/00

*Primary Examiner* — Jonathan Jelsma
(74) *Attorney, Agent, or Firm* — Steven Reiss

(57) ABSTRACT

The present invention relates to method for making a membrane electrode assembly. First, a carbon nanotube film is fabricated to act as a gas diffusion layer. Second, a catalyst layer is formed on the carbon nanotube film to obtain an electrode. Third, a proton exchange membrane is provided, and two electrodes are separately disposed on two opposite surfaces of the proton exchange membrane, thereby forming the membrane electrode assembly.

15 Claims, 6 Drawing Sheets

(56) References Cited

U.S. PATENT DOCUMENTS

| | | | | |
|---|---|---|---|---|
| 2002/0049134 A1* | 4/2002 | Imazato | .............. | H01M 4/8605 |
| | | | | 502/101 |
| 2004/0053780 A1* | 3/2004 | Jiang | ........................ | B01J 23/74 |
| | | | | 502/182 |
| 2004/0105807 A1* | 6/2004 | Fan | ........................ | B82Y 30/00 |
| | | | | 423/447.3 |
| 2004/0197638 A1* | 10/2004 | McElrath | ................ | B01J 21/185 |
| | | | | 429/454 |
| 2004/0202780 A1* | 10/2004 | Morii | ................. | H01M 4/8605 |
| | | | | 427/115 |
| 2005/0031525 A1* | 2/2005 | Iijima | .................... | B82Y 30/00 |
| | | | | 423/445 B |
| 2005/0127030 A1* | 6/2005 | Watanabe | .............. | B82Y 30/00 |
| | | | | 216/41 |
| 2006/0039848 A1* | 2/2006 | Matarredona | ......... | B01F 3/1242 |
| | | | | 423/447.1 |
| 2007/0007872 A1* | 1/2007 | Park | ........................ | B82Y 10/00 |
| | | | | 313/346 R |
| 2007/0237959 A1* | 10/2007 | Lemaire | ................. | B82Y 30/00 |
| | | | | 428/408 |
| 2008/0280169 A1* | 11/2008 | Niu | .......................... | H01B 1/04 |
| | | | | 429/409 |
| 2009/0294753 A1* | 12/2009 | Hauge | .................... | B82Y 30/00 |
| | | | | 257/9 |
| 2010/0159305 A1* | 6/2010 | Yan | ..................... | H01M 4/8605 |
| | | | | 429/523 |

* cited by examiner

METHOD FOR MAKING MEMBRANE ELECTRODE ASSEMBLY

This application is a continuation of U.S. patent application Ser. No. 12/006,336 filed on Dec. 29, 2007 entitled, "MEMBRANE ELECTRODE ASSEMBLY AND METHOD FOR MAKING THE SAME". This application is related to a commonly-assigned patent application Ser. No. 12/006,309 filed on Dec. 29, 2007, entitled, "MEMBRANE ELECTRODE ASSEMBLY AND METHOD FOR MAKING THE SAME". Disclosure of the above-identified application is incorporated herein by reference.

BACKGROUND

1. Field of the Invention

The invention generally relates to membrane electrode assembly and method for making the same and, particularly, to a carbon nanotube based membrane electrode assembly of a fuel cell and method for making the same.

2. Discussion of Related Art

Fuel cells can generally be classified into alkaline, solid oxide, and proton exchange membrane fuel cells. The proton exchange membrane fuel cell has received more attention and has developed rapidly in recent years. Typically, the proton exchange membrane fuel cell includes a number of separated fuel cell work units. Each work unit includes a fuel cell membrane electrode assembly (MEA), flow field plates (FFP), current collector plates (CCP), as well as related support equipments, such as blowers, valves, and pipelines.

The MEA generally includes a proton exchange membrane and two electrodes separately disposed on two opposite surfaces of the proton exchange membrane. Further, each electrode includes a catalyst layer and a gas diffusion layer. The catalyst layer is configured for being sandwiched between the gas diffusion layer and the proton exchange membrane. The material of the proton exchange membrane is selected from the group consisting of perfluorosulfonic acid, polystyrene sulfonic acid, polystyrene trifluoroacetic acid, phenol formaldehyde resin acid, and hydrocarbons. The catalyst layer includes catalyst materials and carriers. The catalyst materials are selected from the group consisting of metal particles, such as platinum particles, gold particles, and ruthenium particles. The carriers are generally carbon particles, such as graphite, carbon black, carbon fiber or carbon nanotubes. The gas diffusion layer is constituted of treated carbon cloth and carbon paper.

The gas diffusion layer of MEA is mainly formed by a carbon fiber paper. A process of making the carbon fiber paper is by the steps of: mixing carbon fibers, wood pulp, and cellulose fibers; using the mixture to obtain a paper pulp; and then forming the carbon fiber paper from the paper pulp. However, the process of making the carbon fiber paper has the following disadvantages: Firstly, the carbon fibers in the carbon fiber paper are not uniformly dispersed, thereby the gaps therein are uneven resulting in the carbon fibers having a small specific surface area. Thus, the structure restricts the gas diffusion layer to uniformly diffuse the gases, which is needed for the MEA. Secondly, the carbon fiber paper has high electrical resistance, thus, restricting the transfer of electrons between the gas diffusion layer and the external electrical circuit, thereby reducing the reaction activity of the MEA. Thirdly, the carbon fiber paper has poor tensile strength, and is difficult to process.

What is needed, therefore, is a membrane electrode assembly having excellent reaction activity and method for making the same being simple and easy to be applied.

SUMMARY

A membrane electrode assembly includes a proton exchange membrane and two electrodes. The proton exchange membrane includes two opposite surfaces. The two electrodes are separately disposed on the opposite surfaces of the proton exchange membrane. Further, each electrode includes a catalyst layer and a gas diffusion layer. The catalyst layer is configured for being sandwiched between the gas diffusion layer and the proton exchange membrane. The gas diffusion layer includes a carbon nanotube film. The carbon nanotube film includes a plurality of carbon nanotubes entangled with each other. And a method for making the membrane electrode assembly is also included Other advantages and novel features of the present membrane electrode assembly and the method for making the same will become more apparent from the following detailed description of present embodiments when taken in conjunction with the accompanying drawings.

BRIEF DESCRIPTION OF THE DRAWINGS

Many aspects of the present membrane electrode assembly and the method for making the same can be better understood with reference to the following drawings. The components in the drawings are not necessarily to scale, the emphasis instead being placed upon clearly illustrating the principles of the present membrane electrode assembly and the method for making the same.

Figure 1:
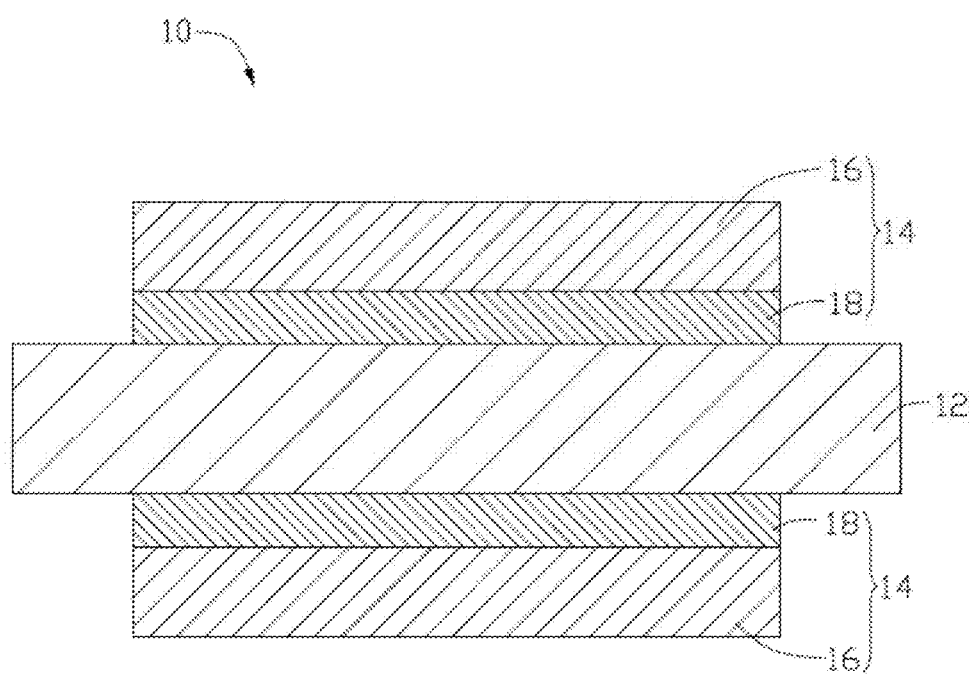
FIG. 1 is a schematic view of a membrane electrode assembly, in accordance with the present embodiment.

Corresponding reference characters indicate corresponding parts throughout the several views. The exemplifications set out herein illustrate at least one present embodiment of the membrane electrode assembly and the method for making the same, in at least one form, and such exemplifications are not to be construed as limiting the scope of the invention in any manner.

DETAILED DESCRIPTION OF PREFERRED EMBODIMENTS

Reference will now be made to the drawings, in detail, to describe embodiments of the membrane electrode assembly and the method for making the same.

Referring to FIG. 1, a membrane electrode assembly 10 is provided in the present embodiment. The membrane electrode assembly 10 includes a proton exchange membrane 12 and two electrodes 14. The proton exchange membrane 12 includes two opposite surfaces. The two electrodes 14 are separately disposed on the two opposite surfaces of the proton exchange membrane 12. Further, each of the electrodes 14 includes a catalyst layer 18 and a gas diffusion layer 16. The catalyst layer 18 is configured for being sandwiched between the gas diffusion layer 16 and the proton exchange membrane 12.

The gas diffusion layer 16 includes a carbon nanotube film. The carbon nanotube film includes a plurality of carbon nanotubes tangled with each other. The adjacent carbon nanotubes are combined and entangled by van der Waals attractive force, thereby forming a network structure/microporous structure. Further, the carbon nanotubes in the carbon nanotube film are isotropic, uniformly dispersed, and disorderly arranged. Due to the carbon nanotube film having a plurality of carbon nanotubes entangled with each other and the microporous structure, the carbon nanotube film has good tensile strength, thereby having a free-standing structure. It is understood that the carbon nanotube film is very microporous. Sizes of the micropores are less of 100 micrometers. Length and width of the carbon nanotube film are not limited. A thickness of the carbon nanotube film is in an approximate range from 1 micrometer to 2 millimeters.

The catalyst materials includes metal particles and carbon particles. The metal particles are selected from the group consisting of platinum particles, gold particles, and ruthenium particles. The carbon particles are selected from the group consisting of graphite, carbon black, carbon fiber, and carbon nanotubes. Quite suitably, the metal particles are platinum; and the carbon particles are carbon nanotubes. The metal particles are dispersed in the carbon particles, thereby forming the catalyst layer 18. The loading of the metal particles is less of 0.5 mg/cm$^2$ (milligram per square centimeter). The material of the proton exchange membrane 12 is selected from the group consisting of perfluorosulfonic acid, polystyrene sulfonic acid, polystyrene trifluoroacetic acid, phenol-formaldehyde resin acid, and hydrocarbons.

Figure 2:
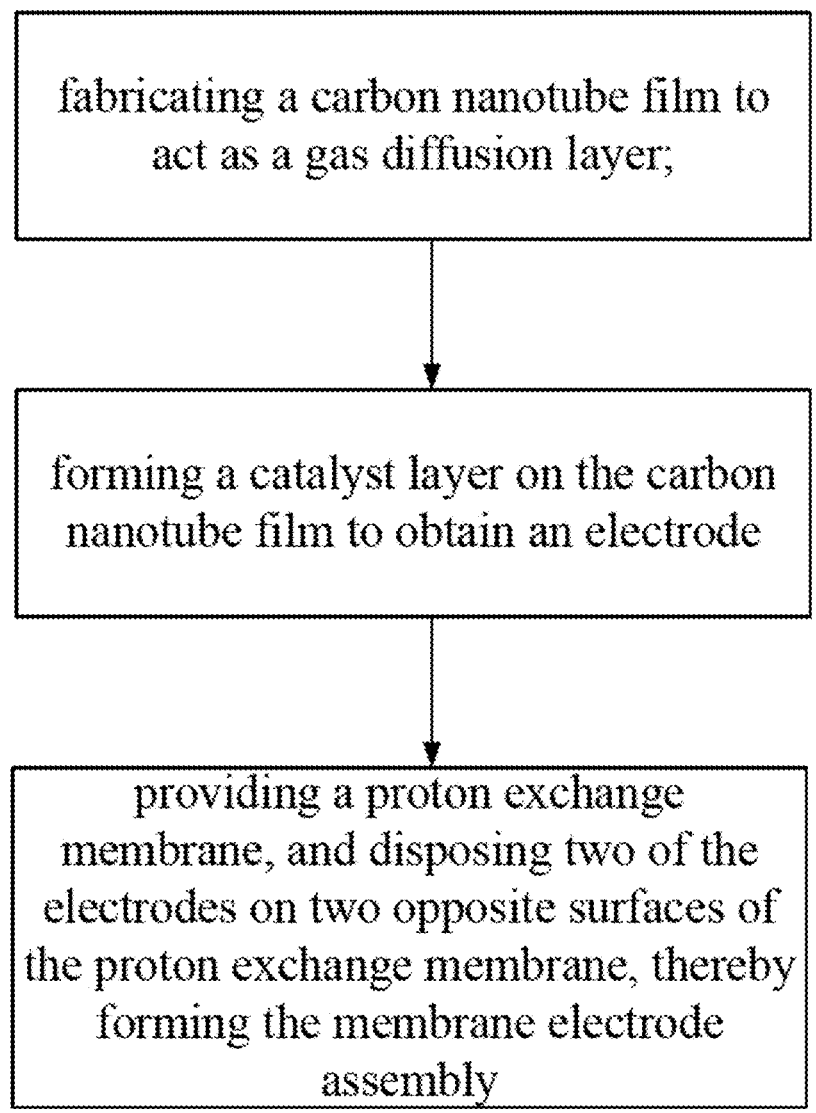
FIG. 2 is a flow chart of a method for making the membrane electrode assembly shown in FIG. 1.

Referring to FIG. 2, a method for making the above-described membrane electrode assembly 10 are provided in the present embodiment. The method includes the steps of: (a) fabricating a carbon nanotube film to act as a gas diffusion layer; (b) forming a catalyst layer on the carbon nanotube film to obtain an electrode; and (c) providing a proton exchange membrane, and disposing two of the electrodes on opposite surfaces of the proton exchange membrane respectively, thereby forming the membrane electrode assembly.

The carbon nanotube film is formed by the substeps of: (a1) providing a raw material of carbon nanotubes; (a2) adding the raw material of carbon nanotubes to a solvent to get a floccule structure; and (a3) separating the floccule structure from the solvent, and shaping/molding the separated floccule structure to obtain a carbon nanotube film.

In step (a1), a raw material of carbon nanotubes is an array of carbon nanotubes, quite suitably, a super-aligned array of carbon nanotubes. The array of carbon nanotubes contains a plurality of carbon nanotubes, which are selected from the group consisting of single-walled carbon nanotubes, double-walled carbon nanotubes, and multi-walled carbon nanotubes. The given super-aligned array of carbon nanotubes can be formed by the steps of: (a11) providing a substantially flat and smooth substrate; (a12) forming a catalyst layer on the substrate; (a13) annealing the substrate with the catalyst layer in air at a temperature in the approximate range from 700° C. to 900° C. for about 30 to 90 minutes; (a14) heating the substrate with the catalyst layer to a temperature in the approximate range from 500° C. to 740° C. in a furnace with a protective gas therein; (a15) supplying a carbon source gas to the furnace for about 5 to 30 minutes and growing a super-aligned array of carbon nanotubes on the substrate; and (a16) separating the array of carbon nanotubes from the substrate to get the raw material of carbon nanotubes.

In step (a11), the substrate can, beneficially, be a P-type silicon wafer, an N-type silicon wafer, or a silicon wafer with a film of silicon dioxide thereon. Preferably, a 4-inch P-type silicon wafer is used as the substrate.

In step (a12), the catalyst can, advantageously, be made of iron (Fe), cobalt (Co), nickel (Ni), or any alloy thereof.

In step (a14), the protective gas can, beneficially, be made up of at least one of nitrogen ($N_2$), ammonia ($NH_3$), and a noble gas. In step (a15), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height more than 100 microns and include a plurality of carbon nanotubes parallel to each other and approximately perpendicular to the substrate. Because the length of the carbon nanotubes is very long, portions of the carbon nanotubes are bundled together. Moreover, the super-aligned array of carbon nanotubes formed under the above conditions is essentially free of impurities such as carbonaceous or residual catalyst particles. The carbon nanotubes in the super-aligned array are closely packed together by the van der Waals attractive force.

In step (a16), the array of carbon nanotubes is scraped from the substrate by a knife or other similar devices to obtain the raw material of carbon nanotubes. Such a raw material is, to a certain degree, able to maintain the bundled state of the carbon nanotubes.

In step (a2), the solvent is selected from the group consisting of water and volatile organic solvent. After adding the raw material of carbon nanotubes to the solvent, a process of flocculating is executed to get the floccule structure. The process of flocculating is selected from the group consisting of ultrasonic dispersion and high-strength agitating/vibrating. Quite usefully, in this embodiment ultrasonic dispersion is used to flocculate the solvent containing the carbon nanotubes for about 10~30 minutes. Due to the carbon nanotubes in the solvent having a large specific surface area and the bundled carbon nanotubes having a large van der Waals attractive force, the flocculated and bundled carbon nanotubes form a network structure (i.e., floccule structure).

In step (a3), the process of separating the floccule structure from the solvent includes the substeps of: (a31) pouring the solvent containing the floccule structure through a filter into a funnel; and (a32) drying the floccule structure on the filter to obtain the separated floccule structure of carbon nanotubes.

Figure 3:
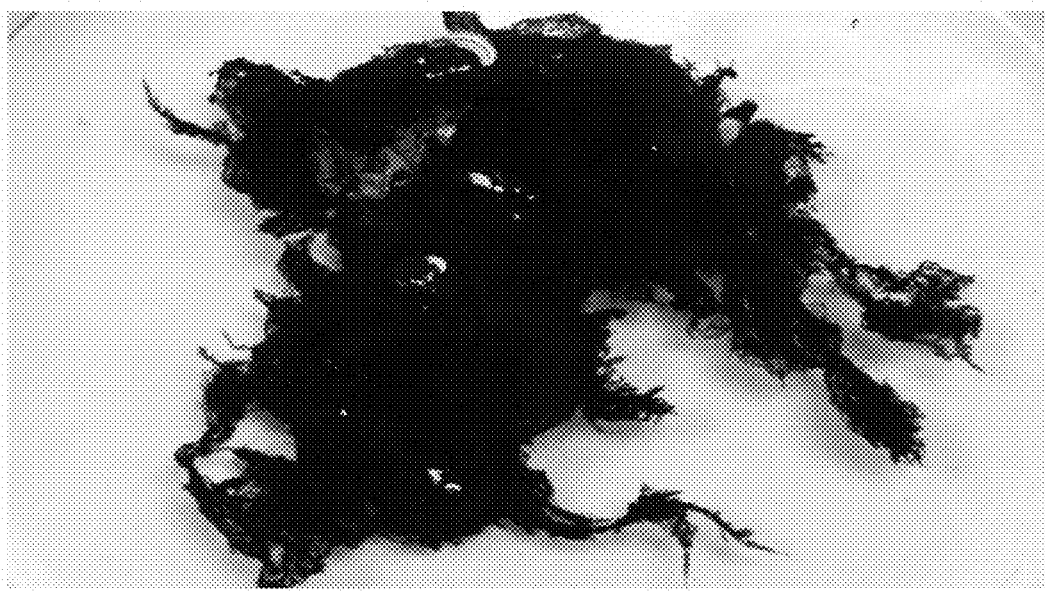
FIG. 3 shows a Scanning Electron Microscope (SEM) image of a flocculated structure of carbon nanotubes formed by the method of FIG. 2.

In step (a32), a time of drying can be selected according to practical needs. Referring to FIG. 3, the floccule structure of carbon nanotubes on the filter is bundled together, so as to form an irregular flocculate structure.

In step (a3), the process of shaping/molding includes the substeps of: (a33) putting the separated floccule structure into a container (not shown), and spreading the floccule structure to form a predetermined structure; (a34) pressing the spread floccule structure with a certain pressure to yield a desirable shape; and (a35) drying the spread floccule structure to remove the residual solvent or volatilizing the residual solvent to form a carbon nanotube film.

It is to be understood that the size of the spread floccule structure is, advantageously, used to control a thickness and a surface density of the carbon nanotube film. As such, the larger the area of a given amount of the floccule structure is spread over, the less the thickness and density of the carbon nanotube film.

Figure 4:
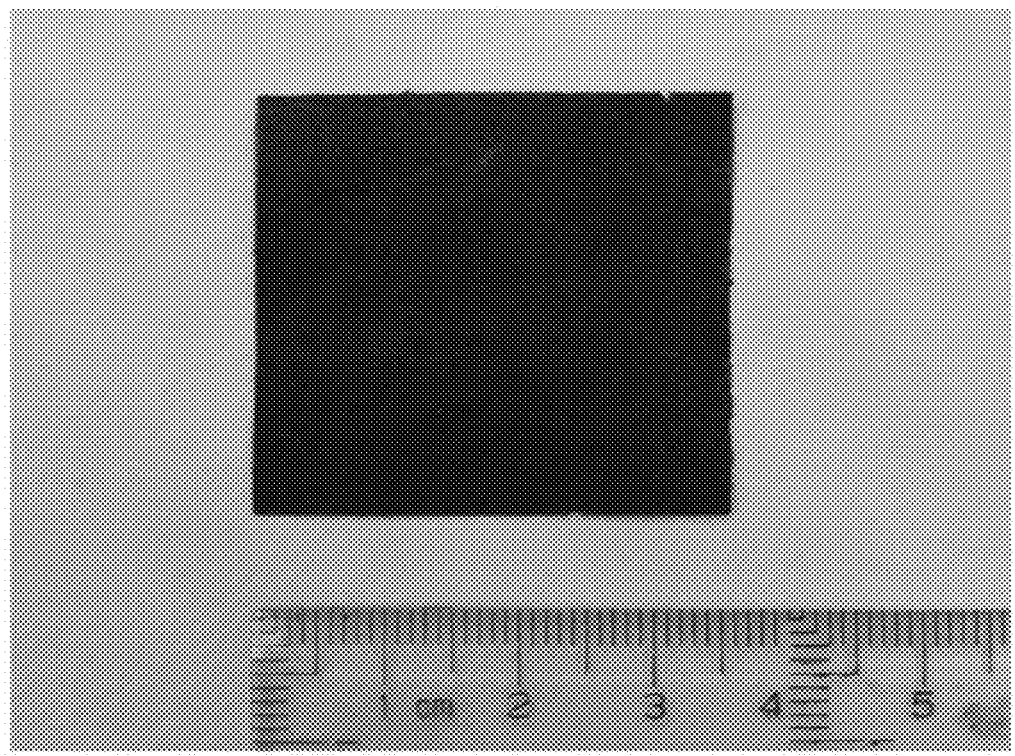
FIG. 4 shows a Scanning Electron Microscope (SEM) image of a carbon nanotube film formed by the method of FIG. 2 wherein the carbon nanotube film has a predetermined shape.

Referring to FIG. 4, bundling of the carbon nanotubes in the carbon nanotube film, provides strength to the carbon nanotube film. Therefore, the carbon nanotube film is, advantageously, easy to be folded and/or bent into arbitrary shapes without rupture. In the embodiment, the thickness of the carbon nanotube film is in the approximate range from 1 micrometer to 2 millimeters, and the width of the carbon nanotube film is in the approximate range from 1 millimeter to 10 centimeters.

Further, the step (a3) can be accomplished by a process of pumping filtration to obtain the carbon nanotube film. The process of pumping filtration includes the substeps of: (a31') providing a microporous membrane and an air-pumping funnel; (a32') filtering the solvent containing the floccule structure of carbon nanotubes through the microporous membrane into the air-pumping funnel; and (a33') air-pumping and drying the floccule structure of carbon nanotubes captured on the microporous membrane.

In step (a31'), the microporous membrane has a smooth surface. And the diameters of micropores in the membrane are about 0.22 microns. The pumping filtration can exert air pressure on the floccule structure, thus, forming a uniform carbon nanotube film. Moreover, due to the microporous membrane having a smooth surface, the carbon nanotube film can, beneficially, be easily separated from the membrane.

The carbon nanotube film produced by the method has the following virtues. Firstly, through flocculating, the carbon nanotubes are bundled together by van der Walls attractive force to form a network structure/floccule structure. Thus, the carbon nanotube film is very durable. Secondly, the carbon nanotube film is very simply and efficiently produced by the method. A result of the production process of the method, is that thickness and surface density of the carbon nanotube film are controllable.

Figure 5:
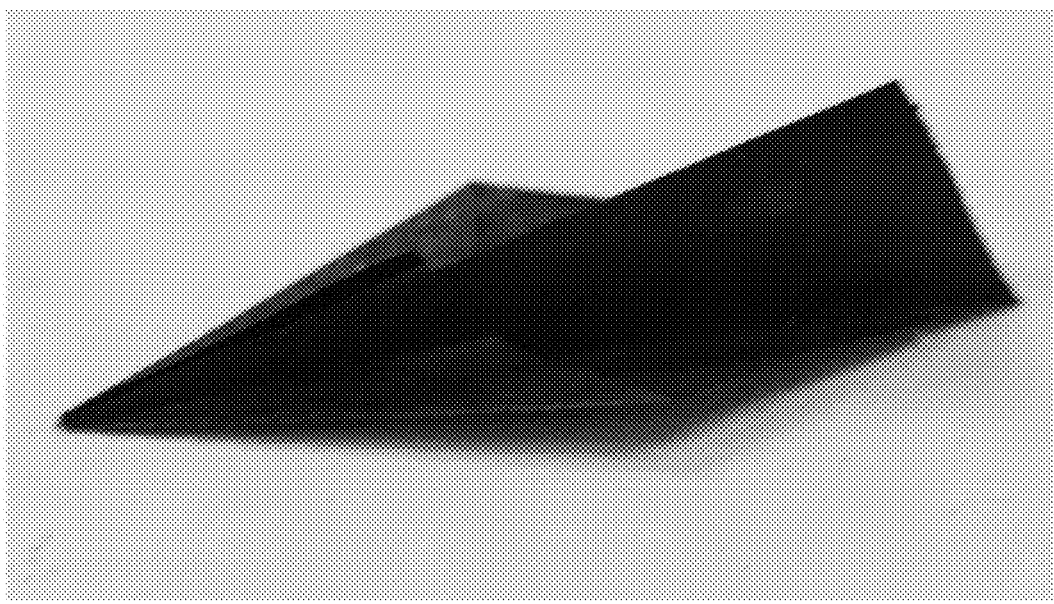
FIG. 5 shows a Scanning Electron Microscope (SEM) image of a carbon nanotube film formed by the method of FIG. 2 wherein the carbon nanotube film has been folded.

The adjacent carbon nanotubes are combined and tangled by van der Waals attractive force, thereby forming a network structure/microporous structure. Thus, the carbon nanotube film has good tensile strength. Referring to FIG. 5, the carbon nanotube film obtained in the present embodiment is folded without rupture. As such, the carbon nanotube film is easy to process, and can, beneficially be folded in most any desired shape.

In practical use, the carbon nanotube film can, beneficially, be cut into any desired shape and size. As such, it is easily applied to use in a fuel cell, especially, in a micro-type of fuel cell acting as a gas diffusion layer.

In step (b), the catalyst layer 18 is formed by the substeps of: (b1) putting metal particles and carbon particles into a dispersion solution; (b2) adding water and a surface active agent to the dispersion solution to obtain a catalyst slurry; (b3) coating the catalyst slurry on the carbon nanotube film and drying the catalyst slurry, thereby forming the catalyst layer on the carbon nanotube film to obtain the electrode.

In step (b1), the metal particles are selected from the group consisting of platinum particles, gold particles and ruthenium particles. The carbon particles are selected from the group consisting of graphite, carbon black, carbon fibers, and carbon nanotubes. The metal particles load on surfaces of the carbon particles. Further, loading of the metal particles is less of 0.5 mg/cm$^2$. The carbon particles have the properties of high conductivity, a high specific surface area, and good corrosion resistance. In order to enhance the dispersion of carbon particles in the dispersion solution, a ball mill refiner is used to mill the carbon particles. CHF 1000 resin is dissolved in dimethyl acetamide to form the dispersion solution. A mass percent of the CHF 1000 resin in the dispersion solution is about 5%.

In step (b2), the surface active agent is used to restrain agglomeration of the carbon particles. Thus, in the present embodiment, isopropanol is used as the surface active agent. After the water and the surface active agent are added into the dispersion solution, a process of dispersing the dispersion solution is executed by an ultrasonic dispersing or an agitating.

In step (b3), a process of coating is executed by a spraying method, an immersing method, or a screen printing method. The above-described methods can, opportunely, ensure that the catalyst slurry is uniformly and densely coated on the carbon nanotube film. In order to reduce the cracks and voids in the catalyst layer 18, the drying method is executed at a low temperature. The drying process is selected from the group consisting of an oven drying method and a sintering method.

In step (c), the two electrodes 14 are attached on the two opposite surfaces of the proton exchange membrane 12 by a heat pressing process. Further, the catalyst layer 18 is configured for being sandwiched between the gas diffusion layer 16 and the proton exchange membrane 12. The material of the proton exchange membrane 12 is selected from the group consisting of perfluorosulfonic acid, polystyrene sulfonic acid, polystyrene trifluoroacetic acid, phenol formaldehyde resin acid, and hydrocarbons.

Figure 6:
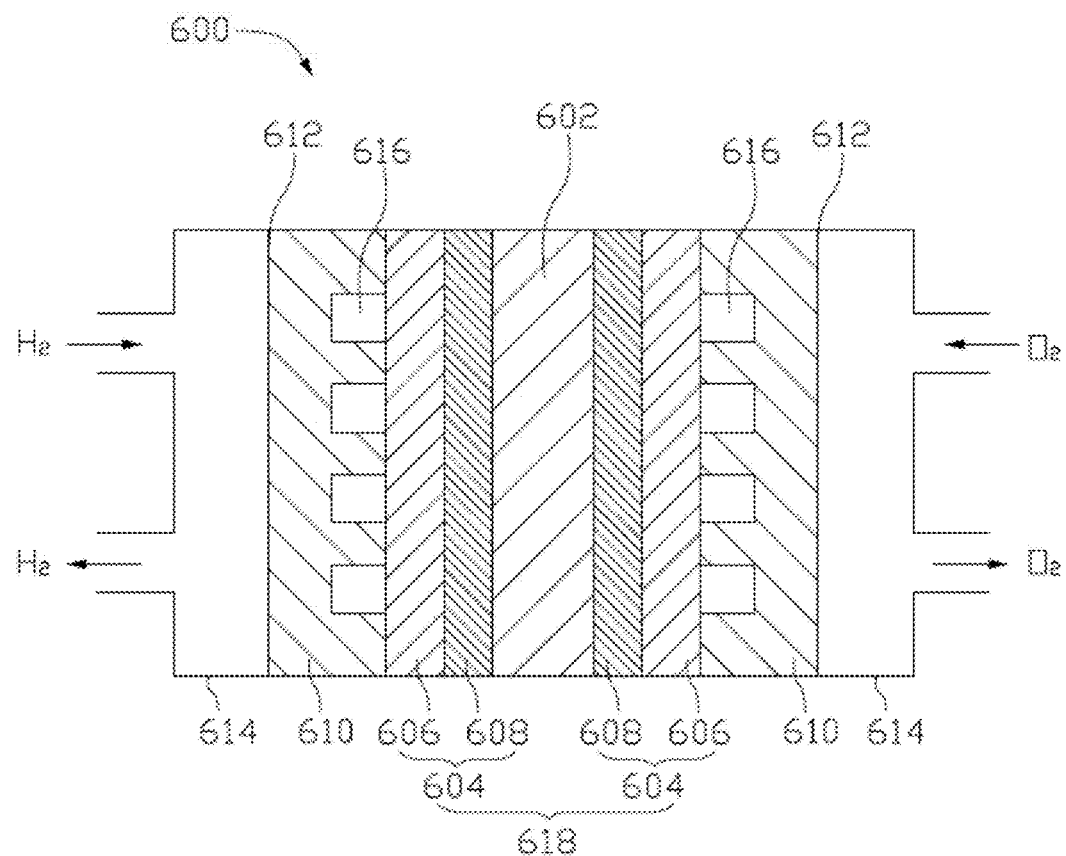
FIG. 6 is a schematic view of a fuel cell in accordance with the present embodiment.

Referring to FIG. 6, a fuel cell 600 is further provided in the present embodiment. The fuel cell 600 includes a membrane electrode assembly (MEA) 618, two flow field plates (FFP) 610, two current collector plates (CCP) 612, as well as related support equipment 614. The MEA 618 includes a proton exchange membrane 602 and two electrodes 604 separately disposed on two opposite surfaces of the proton exchange membrane 602. Further, each electrode includes a catalyst layer 608 and a gas diffusion layer 606. The catalyst layer 608 is configured for being sandwiched between the gas diffusion layer 606 and the proton exchange membrane 602. The proton exchange membrane 602 is selected from the group consisting of perfluorosulfonic acid, polystyrene sulfonic acid, polystyrene trifluoroacetic acid, phenol-formaldehyde resin acid, and hydrocarbons. The proton exchange membrane 602 is used to conduct the protons generated in the MEA 618, and separate the fuel gases and the oxidant gases. The catalyst layer 608 includes catalyst materials and carriers. The catalyst materials are selected from the group consisting of metal particles, such as platinum particles, gold particles or ruthenium particles. The carrier is generally carbon particles, such as graphite, carbon black, carbon fiber or carbon nanotubes. The gas diffusion layer 606 is the carbon nanotube film produced in the present embodiment. The FFP 610 is made of metals or conductive carbon materials. Each FFP 610 is disposed on a surface of each electrode 604 facing away from the proton exchange membrane 602. The FFP 610 has at least one flow field groove 616. The flow field groove 616 is contacted with the gas diffusion layer 606. Thus, the flow field groove 616 is used to transport the fuel gases, the oxidant gases, and the reaction product (i.e. water). The CCP 612 is made of conductive materials. Each CCP 612 is disposed on a surface of each FFP 610 facing away from the proton exchange membrane 602. Thus, the CCP 612 is used to collect and conduct the electrons in the work process of MEA 618. The related support equipments 614 include blowers, valves, and pipelines. The blower is connected with the flow field plate 610 by the pipelines. The fuel gases and the oxidant gases are blown by the blowers In work process of the fuel cell 600, fuel gases (i.e. hydrogen) and oxidant gases (i.e. pure oxygen or air containing oxygen) are respectively applied to a surface of each electrode through the flow field plates 610 by the related equipments 614. Specifically, hydrogen is applied to an anode; and oxygen to a cathode. In one side of the MEA 618, after the hydrogen is applied to the catalyst layer 608, a reaction of each hydrogen molecule is as follows: $H_2 \rightarrow 2H^+ + 2e$. The hydrogen ions generated by the above-described reaction reach the cathode through the proton exchange membrane 602. At the same time, the electrons generated by the reaction also arrive at the cathode by an external electrical circuit. In the other side of the MEA 618, oxygen is also applied to the cathode. Thus, the oxygen is reacted with the hydrogen ions and electrons as follows: $\frac{1}{2}O_2 + 2H^+ + 2e \rightarrow H_2O$. In the electrochemical reaction process, the electrons form an electrical current, thereby being able to output electrical energy. Accordingly, the water generated by the reaction penetrates the gas diffusion layer 606 and the flow field plate 610, thereby removing out of the MEA 608. From the above-described process, it is known that the gas diffusion layer 606 reacts as a channel for the fuel gases, oxidant gases, as well as the electrons. Fuel gas and oxidant gases from the gas diffusion layer 606 arrive at the catalyst layer; and the electrons through the gas diffusion layer 606 are connected with the external electrical circuit.

In the present embodiment, the gas diffusion layer 606 includes the carbon nanotube film. The carbon nanotube film includes a plurality of carbon nanotubes tangled with each other. The adjacent carbon nanotubes are combined and tangled by van der Waals attractive force, thereby forming a network structure/microporous structure. Further, the carbon nanotubes in the carbon nanotube film are isotropic, uniformly dispersed, and arranged in disorder. Thus, the carbon nanotube film has the microporous structure and a large specific surface area. As such, in one side of MEA 618, the hydrogen can be effectively and uniformly diffused in the carbon nanotube film. The hydrogen fully contacts with metal particles in the catalyst layer 608. Thus, the catalytic reaction activity of the metal particles with the hydrogen is enhanced. In another side of the MEA 618, the oxidant gases are also uniformly diffused to the catalyst layer 608 through the carbon nanotube film, thereby fully contacting with the metal particles of the catalyst layer 608. Thus, the catalytic reaction activity of the metal particles with the hydrogen ions and electrons is enhanced. Due to the carbon nanotube film having good conductivity, the electrons needed or generated in the reactions are quickly conducted by the carbon nanotube film.

Moreover, a method for making the carbon nanotube film to be used as the gas diffusion layer 606 has the following virtues. Firstly, through flocculating, the carbon nanotubes are bundled together by van der Walls attractive force to form a network structure/floccule structure. Thus, the carbon nanotube film is very durable. Secondly, the carbon nanotube film is very simply and efficiently produced by the method. A result of the production process of the method, is that thickness and surface density of the carbon nanotube film are controllable.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a membrane electrode assembly, the method comprising the steps of:
   (a) providing a carbon nanotube film to act as a gas diffusion layer, wherein the carbon nanotube film is obtained by steps of:
   (a1) providing a substantially flat and smooth substrate;
   (a2) forming a catalyst film on the substrate;
   (a3) annealing the substrate with the catalyst film in air at a temperature in a range from about 700° C. to about 900° C. for about 30 to 90 minutes;
   (a4) heating the substrate with the catalyst film to a temperature in a range from about 500° C. to about 740° C. in a furnace with a protective gas therein;
   (a5) supplying a carbon source gas to the furnace for about 5 to 30 minutes and growing a super-aligned array of carbon nanotubes on the substrate; and
   (a6) separating the super-aligned array of carbon nanotubes from the substrate to get carbon nanotubes;
   (a7) adding the carbon nanotubes to a solvent to get a floccule structure, wherein the floccule structure comprises bundled carbon nanotubes; and
   (a8) separating the floccule structure from the solvent, and shaping/molding the floccule structure to obtain the carbon nanotube film;
   (b) forming a catalyst layer comprising a plurality of metal particles and a plurality of carbon particles on the carbon nanotube film to obtain an electrode; and
   (c) providing a proton exchange membrane, and disposing two electrodes separately on two opposite surfaces of the proton exchange membrane, thereby forming the membrane electrode assembly.

2. The method as claimed in claim 1, wherein in step (a7), after adding the carbon nanotubes to the solvent, a process of flocculating is executed to get the floccule structure; and the process of flocculating is selected from the group consisting of ultrasonic dispersion and high-strength agitating/vibrating.

3. The method as claimed in claim 1, wherein in step (a8), the separating the floccule structure from the solvent comprises the substeps of:
   (a81) pouring the solvent containing the floccule structure through a filter; and
   (a82) drying the floccule structure captured on the filter to obtain a separated floccule structure of carbon nanotubes.

4. The method as claimed in claim 1, wherein in step (a8), separating the floccule structure from the solvent comprises by the substeps of:
   (a83) putting the floccule structure into a container, and spreading the floccule structure to form a predetermined structure;
   (a84) pressing the floccule structure to yield a desired shape; and
   (a85) drying the floccule structure to remove residual solvent or volatilizing the residual solvent to form the carbon nanotube film.

5. The method as claimed in claim 1, wherein the step (a8) comprises a process of pumping filtration to obtain the carbon nanotube film.

6. The method as claimed in claim 5, wherein the pumping filtration comprises the substeps of:
   (a81') providing a microporous membrane and an air-pumping funnel;

(a82') filtering the solvent containing the floccule structure through the microporous membrane into the air-pumping funnel; and (a83') drying the floccule structure captured by the microporous membrane by air-pumping.

7. The method as claimed in claim 1, wherein in step (a8), a process of cutting the carbon nanotube film is provided to form a predetermined size of the gas diffusion layer.

8. The method as claimed in claim 1, wherein step (b) forming the catalyst layer on the carbon nanotube film comprises the sub steps of:

(b1) putting the plurality of metal particles and the plurality of carbon particles into a dispersion solution;

(b2) adding water and a surface active agent to the dispersion solution to obtain a catalyst slurry; and (b3) coating the catalyst slurry on the carbon nanotube film and drying the catalyst slurry, thereby forming the catalyst layer on the carbon nanotube film to obtain the electrode.

9. The method as claimed in claim 8, wherein in step (b3), coating the catalyst slurry on the carbon nanotube film is executed by a spraying method, an immersing method, or a screen printing method.

10. The method as claimed in claim 1, wherein in step (c), the two electrodes are attached on the two opposite surfaces of the proton exchange membrane by a heat pressing process.

11. The method as claimed in claim 1, wherein the plurality of carbon particles is plurality of carbon nanotubes.

12. The method as claimed in claim 1, wherein the catalyst layer consists of platinums and the plurality of carbon nanotubes.

13. A method for making a membrane electrode assembly comprising the steps of:

flocculating a plurality of carbon nanotubes in a solvent to get a network structure, wherein the network structure comprises bundled carbon nanotubes; and separating the network structure from the solvent, and shaping/molding the network structure to obtain a carbon nanotube film;

forming a catalyst layer comprising a plurality of metal particles and a plurality of carbon particles on the carbon nanotube film to obtain an electrode; and disposing the electrode separately on two opposite surfaces of a proton exchange membrane.

14. The method as claimed in claim 13, wherein the plurality of metal particles is dispersed in the plurality of carbon particles.

15. The method as claimed in claim 13, wherein the plurality of metal particles is selected from the group consisting of platinum particles, gold particles, and ruthenium particles, the plurality of carbon particles is selected from the group consisting of graphite, carbon black, carbon fiber, and carbon nanotubes.

* * * * *